United States Patent
Yi et al.

(10) Patent No.: US 9,948,385 B2
(45) Date of Patent: Apr. 17, 2018

(54) METHOD FOR DETECTING OTDR CURVE TAIL END EVENT TO LOCATE OPTICAL FIBRE BREAK POINT IN ONLINE MODE

(71) Applicant: Accelink Technologies Co., Ltd., Wuhan (CN)

(72) Inventors: Shuihan Yi, Wuhan (CN); Jiekui Yu, Wuhan (CN); Qing Luo, Wuhan (CN); Zhizhu Zhou, Wuhan (CN); Lei Yu, Wuhan (CN)

(73) Assignee: Accelink Technologies Co., Ltd. (CN)

(*) Notice: Subject to any disclaimer, the term of this patent is extended or adjusted under 35 U.S.C. 154(b) by 0 days.

(21) Appl. No.: 15/321,547

(22) PCT Filed: Jun. 30, 2014

(86) PCT No.: PCT/CN2014/081105
§ 371 (c)(1),
(2) Date: Dec. 22, 2016

(87) PCT Pub. No.: WO2015/196496
PCT Pub. Date: Dec. 30, 2015

(65) Prior Publication Data
US 2017/0180041 A1 Jun. 22, 2017

(30) Foreign Application Priority Data
Jun. 23, 2014 (CN) .......................... 2014 1 0282774

(51) Int. Cl.
*H04B 10/071* (2013.01)
*H04B 10/079* (2013.01)
(52) U.S. Cl.
CPC ....... *H04B 10/071* (2013.01); *H04B 10/0791* (2013.01)
(58) Field of Classification Search
CPC .................. H04B 10/071; H04B 10/0791
See application file for complete search history.

(56) References Cited

U.S. PATENT DOCUMENTS 5,131,743 A 7/1992 Kaneko et al.
5,442,434 A * 8/1995 Liao .................. G01M 11/3145
356/73.1

(Continued)

FOREIGN PATENT DOCUMENTS

| CN | 101753207 | 6/2010 |
| CN | 101895339 | 11/2010 |
| EP | 0468412 | 1/1992 |

OTHER PUBLICATIONS

International Search Report for Application No. PCT/CN2014/081105 dated Mar. 24, 2015.

*Primary Examiner* — Ken N Vanderpuye
*Assistant Examiner* — Mina Shalaby
(74) *Attorney, Agent, or Firm* — Lerner, David, Littenberg, Krumholz & Mentlik, LLP

(57) ABSTRACT

Disclosed is a method for detecting an OTDR curve tail end event to locate an optical fiber break point in an online mode, comprising following steps: 1, an OTDR emits detection light to an optical fiber operation link, and receives reflection light to form reflection sampling point data containing tail end event; 2, head end reflection point in sampling point is found out; 3, traversal is carried out to find search region end point; 4, segmented line fitting is carried out in region of [search region end point, head end reflection point] in reversed direction, start point of section of line meeting predetermined condition is used as a search region start point; 5, if absolute value of difference between largest sampling value in search region and sampling value of search region start point is larger than second preset threshold value, tail end event is judged as reflection tail end event.

11 Claims, 10 Drawing Sheets

(56) References Cited

U.S. PATENT DOCUMENTS

| | | | | |
|---|---|---|---|---|
| 5,450,191 A * | 9/1995 | Parks | ............... | G01M 11/3109 356/73.1 |
| 5,933,227 A * | 8/1999 | Furuhashi | ............ | H04B 10/071 356/73.1 |
| 6,310,702 B1 * | 10/2001 | Minami | ............... | H04B 10/071 356/73 |
| 6,674,518 B1 * | 1/2004 | Asher | ............... | G01M 11/3109 356/73.1 |
| 2014/0111795 A1 * | 4/2014 | Barnhart | ............ | G01M 11/3136 356/73.1 |

* cited by examiner

METHOD FOR DETECTING OTDR CURVE TAIL END EVENT TO LOCATE OPTICAL FIBRE BREAK POINT IN ONLINE MODE

CROSS REFERENCE TO RELATED APPLICATIONS

The present application is a national phase entry under 35 U.S.C. § 371 of International Application No. PCT/CN2014/081105, filed Jun. 30, 2014, which claims priority from Chinese Patent Application No. 201410282774.8, filed Jun. 23, 2014, all of which are hereby incorporated herein by reference.

FIELD OF THE INVENTION

Embodiments of the present invention relates to technical field of optical network, in particular to a method for locating breakpoint of an optical fiber by applying OTDR for end event detection in a scene of online mode.

BACKGROUND OF THE INVENTION

OTDR is Optical Time Domain Reflectometer. By emitting a light pulse into the fiber and receiving returned curve information, link condition is detected. When light pulse propagates within an optical fiber, scattering and reflection are generated due to property of the fiber itself, connector, fusion point, bent or other similar events. In OTDR, there are mainly Rayleigh scattering and Finel reflection, some of which will return to OTDR. The following formula shows how OTDR measures distance:

$$d=(c \times t)/2(IOR),$$

where d is distance (fiber length) to be measured, c is velocity of light in vacuum, IOR is index of refraction of the optical fiber, and t is total time from sending signal to receiving the same (round-trip).

Optical cable monitoring system integrates OTDR, optical switch, light source, optical power meter, optical coupler and other hardware devices, applies typical network and database technology, which help the operator complete the system running task easily, view a series of test results. The system automatically manages OTDR equipment, monitors optical cable network, provides feedback on real-time alarm analysis and optical cable performance degradation analysis. All optical cable test data and results are stored in the database for query and analysis.

The online monitoring model is the most commonly used mode of cable monitoring, that is, optical cable monitoring system and business operation system are running at the same time, detection light and business light emitted from the OTDR are coupled and transmitted in the line together. Main function of optical cable monitoring is to detect the line in which optical fiber is in fault, provide accurate fault location information, so that maintenance personnel can go to the location for maintenance. The past SDH networks are single wave system with low outgoing optical power. Now wave division system has been popular with high outgoing optical power, which cannot be completely isolated, resulting jitter in reflected light collected by the OTDR. For the single wave system, SNR is raised usually by increasing the dynamic range, increasing the number of averaging steps. On the other hand, in wavelength division system, the time of analysis is extended if the dynamic range and the number of averaging step is increased continuously, resulting non-linear effect, and it needs expensive hardware support. Therefore, for the on-line monitoring mode, it is a economical and practical way to design an optimized algorithm to analyze breakpoint of the optical fiber.

There are many patent literatures involved in locating end events. U.S. Pat. No. 5,442,434 uses template matching method to match the end reflection events, which need to test the fiber to build a matching template, and then match reflection events by the template. In process of template matching, it is needed to match each point one by one to calculate matching degree, and design different templates for every curve. The method is time-consuming, requires large memory space. It is difficult to establish different templates, and the overall implementation is complex. Further, in the literature, it is only mentioned reflection end template matching method, without considering case of the non reflection end.

The European patent application EP0468412 uses the difference method to perform data transform on the OTDR curve, which increases the amplitude of the reflection peak. Threshold judgment rule is set by the characteristic of the end of the transformed curve to locate the reflection end event and the non reflection end event. Although this method considers two cases of the end event, such transformation makes the noise amplitude large, even larger than end reflection amplitude. Since the end event is near tail noise, obviously, the method is likely to produce false judgment on the end.

U.S. Pat. No. 6,674,518 determine breakpoint of optical fiber by using a first order differential method and filtering method. This method only considers case of non reflection end, in which after the differential method, breakpoint location will be subjected to mutation, reflection point will also be subjected to mutation. A filter is designed to filter reflection mutation point to locate end mutation position. However, online noise will produce a large amplitude of mutation, the filter cannot completely filtered the same, so this method cannot resist impact of noise.

From above, general method of OTDR detecting end events cannot effectively remove noise, distinguish various end events, and detect a variety of end event in online case, which affects reliability of optical fiber monitoring system. Therefore, a new detection method is needed, which can locate a variety of end events accurately, is simple to implement, and does not need to spend a lot of time and memory space for practical use.

SUMMARY OF THE INVENTION

In order to overcome the deficiencies of the prior art, an embodiment of the invention provides a method for detecting OTDR curve end event to locate breakpoint of optical fiber in online mode, in which two end events are to be detected. The OTDR curve end event detection method designed for on-line mode according to an embodiment of the invention is also suitable for general OTDR end event detection.

According to an embodiment of the invention, it is proposed a method for locating breakpoint of an optical fiber by detecting OTDR curve end event in online mode, which comprises the following steps: step 1, OTDR issuing test light to an optical fiber business link, and receiving the reflected light to form a data curve of reflection sampling points including end events; step 2, finding a head reflection point (is) in the data curve of reflection sampling points; step 3, on the data curve of reflection sampling points, performing forward traversal from the head reflection point (is), finding a first sampling point, of which sampling value reaches a first predetermined threshold value, as an end point (EndP) of search interval; step 4, in region of [the end point of search interval, the head reflection point] of the data curve of reflection sampling points, performing reverse piecewise linear fitting, and when a line segment after the linear fitting meets a predetermined condition, taking a starting point of the line segment as a starting point (es) of the search interval; step 5, if an absolute value of a difference between maximum sampling value (je) in the search interval and a sampling value of the starting point of the search interval is greater than a second predetermined threshold value, determining an end event as a reflection end event, otherwise determining the end event as non reflection end event.

Beneficial effect of embodiments of the invention lies mainly in that: compared with the prior art, embodiments of the invention add a multi-case determination mechanism for end event detection, reduce effect of noise and business signal, improve accuracy of method for detecting OTDR curve end event, and can accurately detect location of the end event in the online mode, and locate the breakpoint of the optical fiber.

DESCRIPTION OF THE PREFERRED EMBODIMENT

Figure 1:
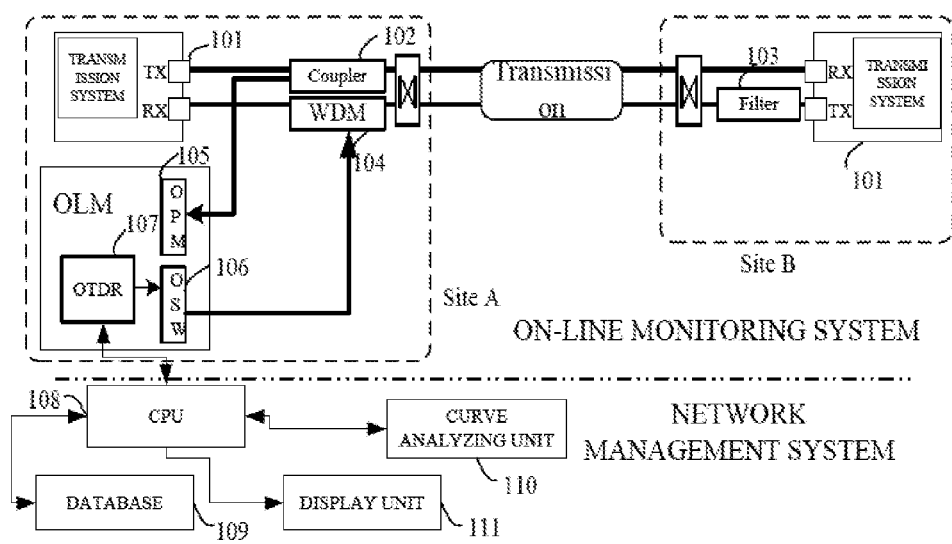
FIG. 1 is a block diagram of optical cable monitoring system in the online mode according to an embodiment of the invention, in which a platform for realizing the embodiment of the invention is shown as being under dotted line, that is, a network management system for managing testing process, analyzing test result, storing and displaying the result.

The following combination of drawings and specific implementation methods are for further details of the technical scheme of the invention, the advantages and characteristics of the present invention will be described with more clearly.

Those skilled in the art will appreciate, although the following description relating to the embodiment of the invention is related to many of the technical details, but this is only used to illustrate the principle of the invention of the sample, and does not imply any restrictions. Besides the technical details of the invention can be applied to different occasions in the following examples, as long as they can not deviate from the principle and spirit of the invention.

In addition, in order to avoid the tedious manual to describe, in the description, some technical details which are available in the existing data may be omitted or simplified, it is understandable for those skilled in the art, and this will not affect the sufficient disclosure this description.

First, the principle of the technical solution according to an embodiment of the present invention will be outlined.

It is proposed a method for locating breakpoint of an optical fiber by detecting OTDR curve end event in online mode, for locating of starting point of the event for two cases of the end event having reflection peak and having not reflection peak, comprising following steps:

(1) collecting test curve sampling points to determine the analysis parameters;

(2) grouping the sampling points, using point-by-point comparison method to determine head end reflection point (is), determining end event search interval starting point (es), end point (EndP);

(3) determine type of the end event: searching maximum value point (je) in the search interval, of which the value subtracts a value of the starting point of the search interval, if resulted difference is greater than a preset threshold, then the end event is determined as a reflection peak, otherwise as a non reflection peak;

(4) if the end event is the reflection peak, firstly, using a piecewise fitting method to get a result 1 (ps) of a starting point of the end reflection, and then using a point-by-point comparison method to get a result 2 (ps1) of a starting point of the end reflection; judging and selecting of starting point of the end reflection: if the result 1 is more than the result 2, selecting the result 2 as the starting point of the end reflection, otherwise, selecting the result 1 as the starting point of the end reflection; locating end point (pe) of the end reflection by using the point-by-point comparison method;

(5) if the end event is non reflection peak, firstly, using the piecewise fitting method to locate a starting point of the end non reflection, then locating an end point of the end non reflection using a maximum distance principle: determining a falling edge of a non reflection peak, selecting a point on the falling edge, connecting the point with the starting point of the non reflection, then get a line segment; finding a point with maximum vertical distance to the line segment in a region from the starting point to the falling edge, as an end point of the end non reflection.

(6) after completing the search for the end event, outputting and displaying a list of the end events (the list mainly includes an end starting value (km), an end value (km) of the end); comparing to judge whether optical fiber breakpoint is appeared, outputting the alarm result to a display unit of the network management system.

Length of sampling points grouping in the step (2) is half of number of sampling points within the unit pulse width.

The head reflection point in the step (2) is a first peak point in the sampling points.

The result 2 in step (4) is an inflection point on the rising edge of the reflection peak.

The end point of the end reflection in the step (4) is an inflection point on the falling edge of the reflection peak.

The piecewise fitting method in steps (4) and (5) comprises: in an interval, fitting each point in the interval with a pre-set fitting length, getting fitting slope of each point, a absolute difference and a variance; if all of the three values are within the preset threshold range, then determining the point being in a line segment.

"comparing to judge whether optical fiber breakpoint is appeared, outputting the alarm result to a display unit of the network management system" in step (6) comprises: getting a difference between the starting position for the end event and another starting position for the end event in reference curve, if an absolute value of the difference does not exceed a preset threshold, determining that there is no breakpoint in the optical fiber, otherwise, generating a fiber break alarm.

FIG. 1 is a block diagram of optical cable monitoring system in the online mode according to an embodiment of the invention, An optical power meter 105 in FIG. 1 measures business light in the transmission system 101 in real-time, in which the business light is split into the optical power meter 105. When the optical power meter 105 detected no light, OLM (optical cable monitoring system) notifies a control computer 108, which determines that link state may be abnormal, issues instruction to trigger OTDR 107 issuing a test light which will be coupled into the business line by OSW (optical switch) 106 and WDM 104, which locates break position and determines whether the link is interrupted, by receiving reflected light (OSW receives the reflected light and transmits the same to the OTDR).

Figure 3:
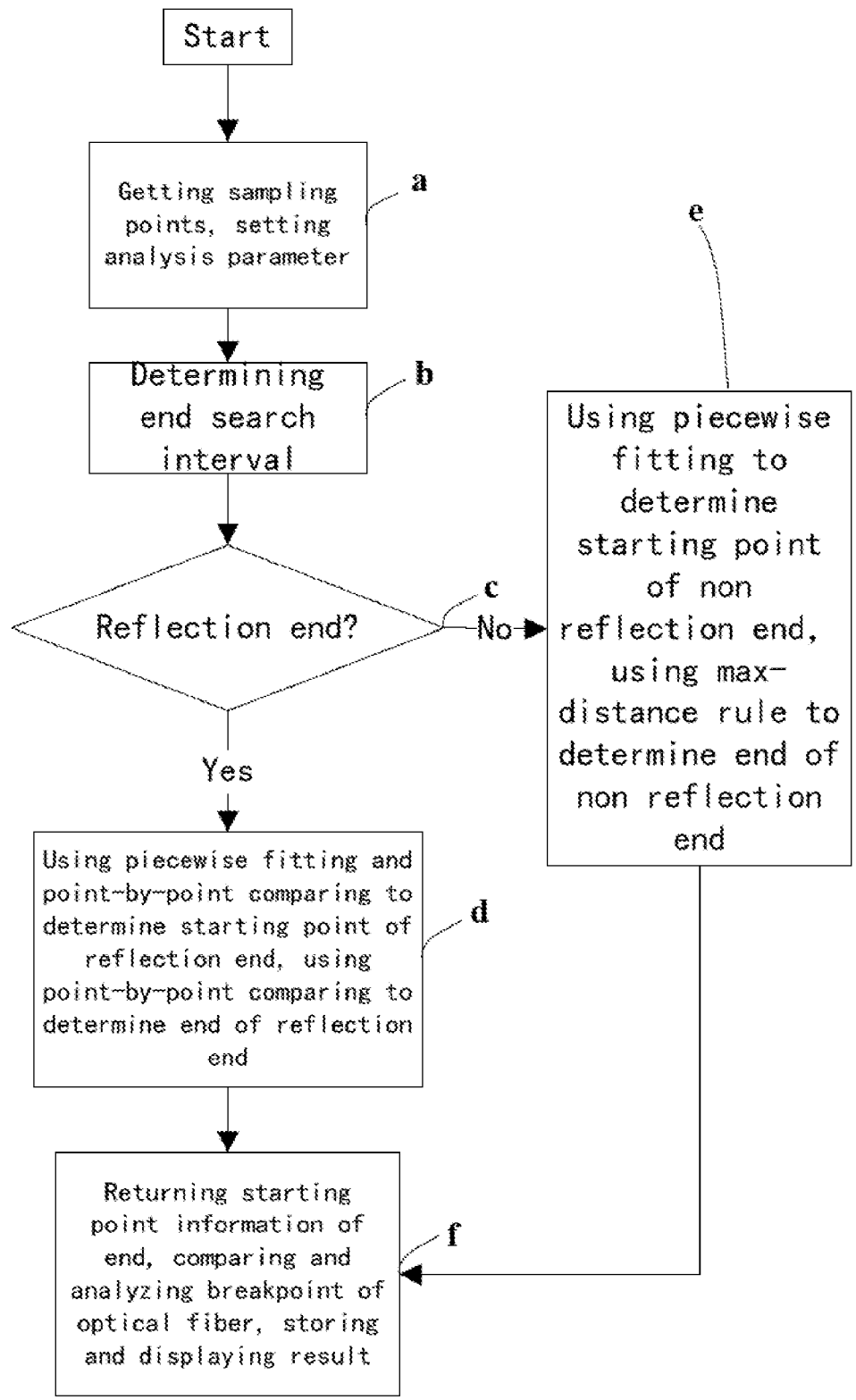
FIG. 3 is an overall flow chart of a method for detecting starting point and end point of the end event of the OTDR curve according to an embodiment of the present invention.

FIG. 3 is an overall flow chart of a method for detecting starting point and end point of the end event of the OTDR curve according to an embodiment of the present invention.

Figure 2A:
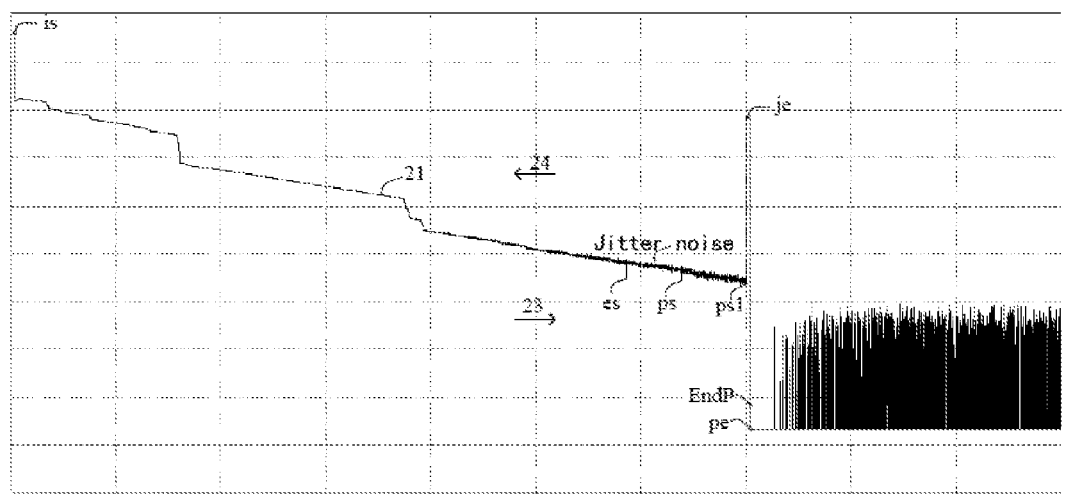
FIG. 2a is a schematic diagram of the OTDR reflection end curve and inflection point thereof in the online mode according to the embodiment of the present invention.
Figure 2B:
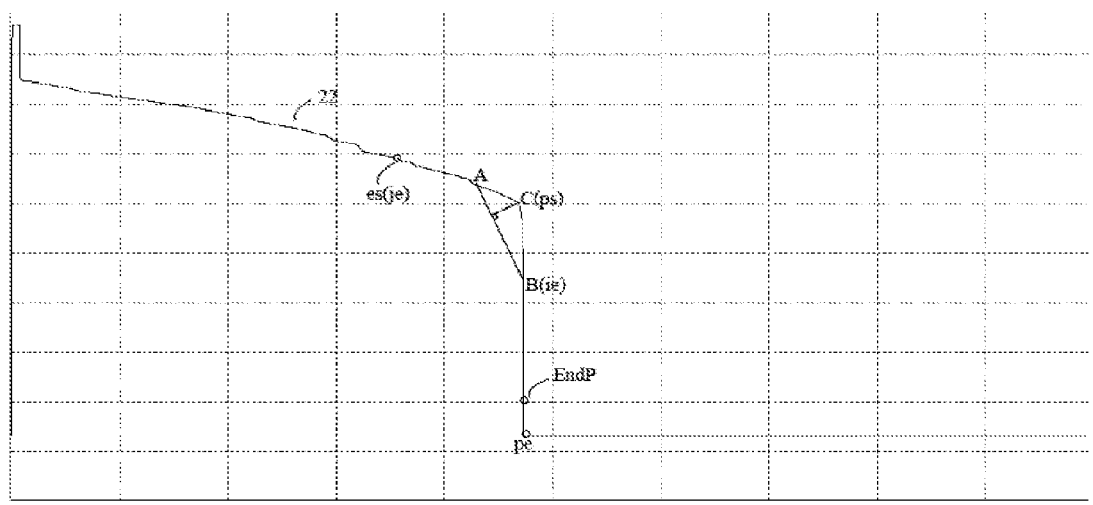
FIG. 2b is a schematic diagram showing the OTDR non reflection end curve in the online mode, and principle of locating end point of the non reflection end event using a maximum distance method.

Next, each steps in FIG. 3 will be described. OTDR curve data is expressed as a form of {i, y (i)}, wherein i represents numbers 1, 2, 3 . . . of the sampling points along the time axis, y (i) represents the corresponding sampling value, with unit of dB. Curve 21 in the FIG. 2a is for a case of the reflection end, curve 22 in the FIG. 2b is for a case of the non reflection end.

Figures 3A, 3B:
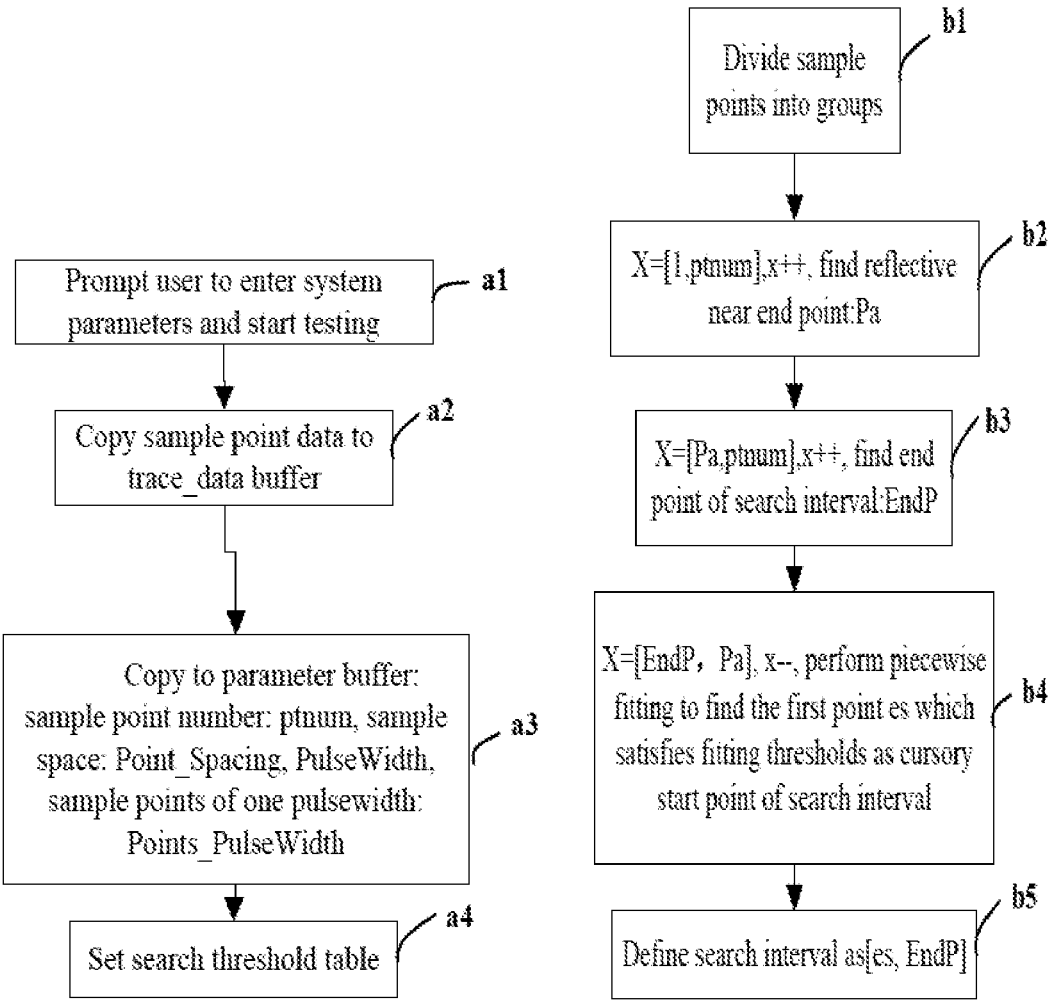
FIGS. 3a-3f are specific flow charts of the method for detecting starting point and end point of the end event of the OTDR curve according to an embodiment of the present invention.
Figure 4A:
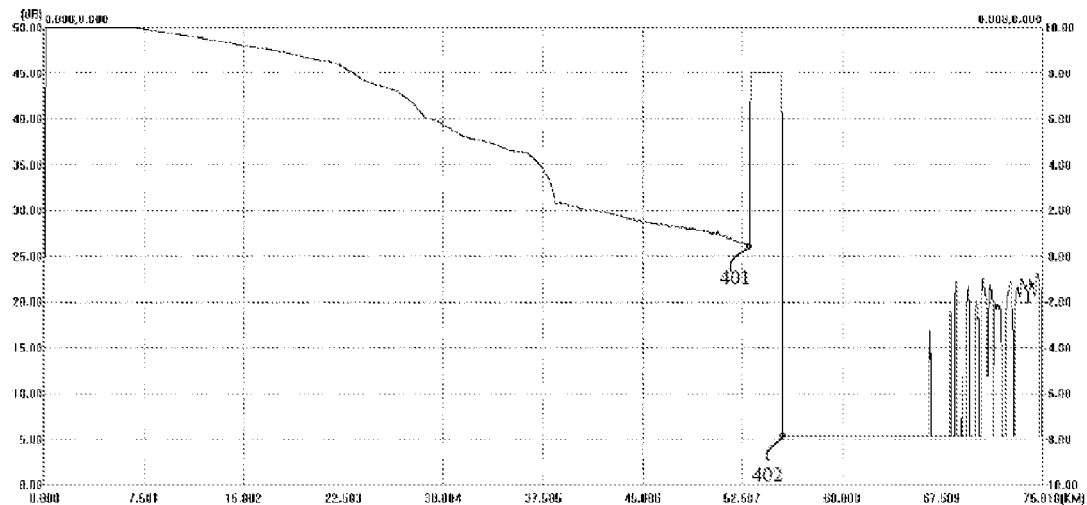
FIGS. 4a, 4c and 4e show results from detecting starting point and end point of the end event of the OTDR curve according to an embodiment of the present invention.

FIG. 3a shows a parameter initialization step (i.e., expanded description of step a in FIG. 3): OTDR tests and returns test data based on the parameters set by the user. Required analysis parameters are shown in a3. Obtained three test curves are shown in FIGS. 4a, 4c and 4e respectively, in which FIGS. 4a and 4e correspond to cases of the reflection end event, FIG. 4c corresponds to case of the non reflective end events.

FIG. 3b shows steps for determining end search interval (i.e., extended description of step b in FIG. 3).

Assuming the sampling points (for example, each test curve is comprised of 50000 points) were divided into N groups, length of which is half of the number of the sampling points within unit pulse width of the test light (for example, the number of the sampling points within unit pulse width is 2000 (points), half of which is 1000 (points), wherein N=50). Purpose of this grouping is to have at least one grouping point in each event interval while improving search efficiency. In the N groups of points, by use of the point-by-point comparison method, the method is to forward look for a first peak point is (head reflection point), direction of which is shown in FIG. 2a as arrow 23.

Specifically, from left to right, sample values of corresponding points (for example, the first point of each group, total N points) in each group are compared, to find a point (is) of which the sampling value y(is) is greater than corresponding point in adjacent group, as the first peak point.

Then, an end point EndP of the search interval is searched for, within a region from the first peak point (is) to the last sampling point. Specifically, if the minimum sampling value in all of the 50000 sampling points is 5 dB, a threshold of 3 dB can be set. From the first peak point (is), from left to right, the first point with value of 8 dB (5+3 dB) is found as the end point EndP of the search interval (EndP is general in the falling edge at the end, in some cases in noise area, as FIG. 2 identifies only a general situation).

Next, in [EndP, is], reverse (from right to left in the Fig) piecewise linear fitting is performed, the direction of which is shown in FIG. 2a as arrow 24. Number of points in each segment of linear fitting can be set to 2000 (points) (the number of sampling points within unit pulse width). Thus, the slope, absolute value difference and variance of each fitted line segment are obtained. The absolute value difference is a maximum value among differences between sampling values of N sampling points and corresponding points of the fitting curve. The variance=square of [(difference between N sampling values and y value in the corresponding fitting curve and corresponding y value)–(average of differences)], divided by the number of the fitting points, then subjected to square-root.

Attenuation rate per unit length of common optical fiber is 0.1 to 0.5, so that the slope range can be set from −0.1 to −0.5, and the absolute value difference and the varience are less than 1, as determination condition of fitting line segment. In a direction from EndP to is, piecewise linear segment is performed. When the slope, the absolute value difference and variance all meet above conditions, the starting point of the line segment is recorded (right end point), as starting point es of the search interval, then stopping the search. Using group number to indicate the positions of es and EndP, which are converted to actual point number (abscissa value), the search interval [es, EndP] of the end event can be obtained.

Figure 3C:
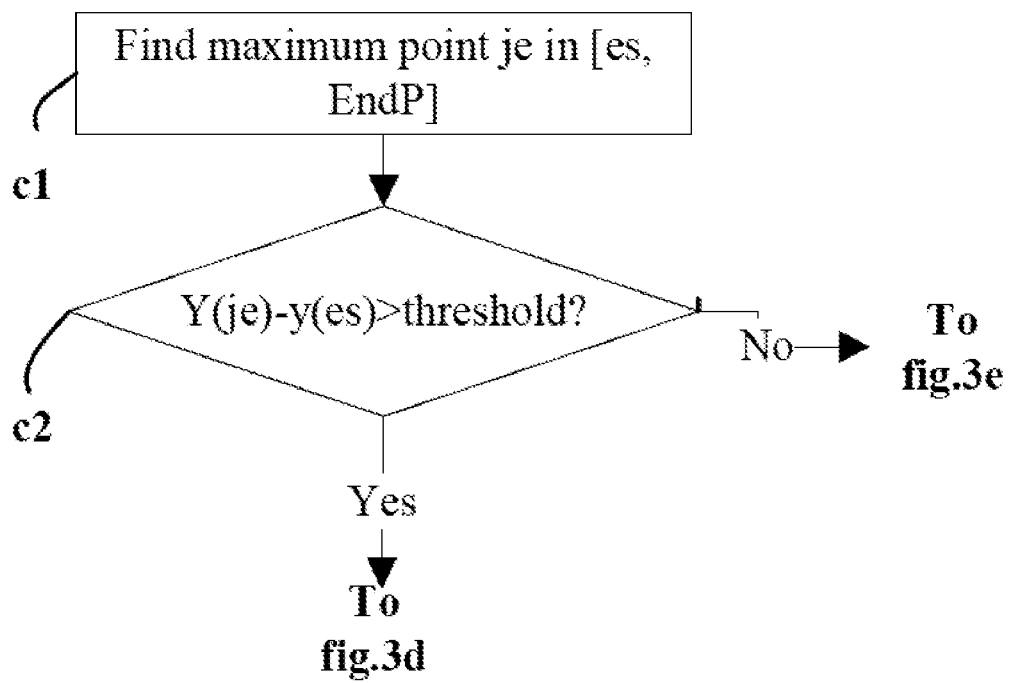

FIG. 3c shows the end type judgment step (i.e., the expanded description of step c in FIG. 3). As shown, the maximum point je is found in the search interval [es, EndP]. According to the difference between y(je) and y(es), the type of end event is determined. If the value of point je is not close to the value of point es, that is, difference between y(je) and y(es) should exceed preset threshold value, then it is determined as the reflection end events. Next, step d will be performed (see FIG. 3d). Otherwise, if y (JE) and Y (ES) does not exceed the set threshold value, then judged as non reflection end event, followed by the implementation of step e (see FIG. 3e).

Figure 3D:
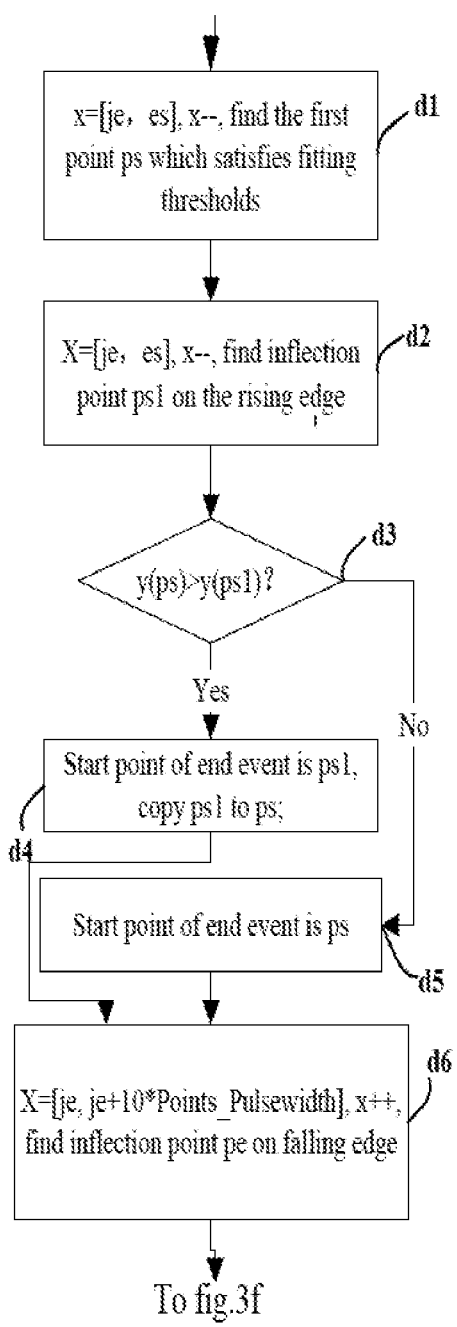

FIG. 3d shows the reflection end positioning step (i.e., the expanded description of step d in FIG. 3). As shown, the end event of curve of the FIG. 4a meets the above conditions c2 (see FIG. 3c), the operation in FIG. 3d is performed. Specifically, in the region of [je, es], by using reverse point linear fitting method (i.e., the segment length is still 2000, linear fitting is performed each time moving from right to left by a point), to find potential starting point ps of the end event (that is, the starting point of line segment meeting the above criteria for the linear fitting (right end point) as the candidate result 1), then stopping the search. Since the end event is a reflection peak, there is a rising edge. Further, in [je, es], each two values of each two point are compared in reverse. When y (ps1) is less than the values of the adjacent two points, the inflection point psi of rising edge is found (it can be carried out by using simple comparison method for comparing the difference between two adjacent points, as a candidate results 2), then stopping the search.

As shown in the curve of FIG. 4a, slope of front end of the end event is flat without noise, thus ps and psi are equal, not meeting the conditions d3, then performing d5, to find starting point ps of the end event, as shown in FIG. 4a as 401.

Similarly, the end event of curve in the FIG. 4e meets the above condition c2 (see FIG. 3c), then performing the operation in FIG. 3d. However, slope of front end of the end event of curve in the FIG. 4e is not flat with noise, thus the fitting line descends (absolute slope value of fitting line is increased), finding candidate starting point of the end event which is in front of actual starting point (to the left). In this way, y(ps) is far greater than y(ps1), to meet the conditions d3, then performing d4, to find another candidate starting point psi of the end event starting point as final starting point of the end event, as shown in FIG. 4e as 409. In short, ps can prevent a case that when there is a small peak on the rising edge, ps1 causes judgment error. psi can prevent a case that jitter of the curve is large, then fitting point offsets cause judgment error at ps. The judgment rule combines the advantages of both cases, overcome the disadvantages of them.

Next, to continue to perform d6, in [je, je+10*Points_Pulsewidth] (the coefficient of 10 times is only for an example, in fact, a few times of sampling point number can be taken within the unit pulse width after je), By comparing forwardly (from left to right) two values point-by-point, when sampling value y(pe) of a point pe is smaller than or equal to the adjacent two values respectively, an inflection point of the falling edge can be found, then stopping the comparisons, and determining PE as an end point of the end event, as shown in FIG. 4a as 402, and FIG. 4e as 410.

Figure 3E:
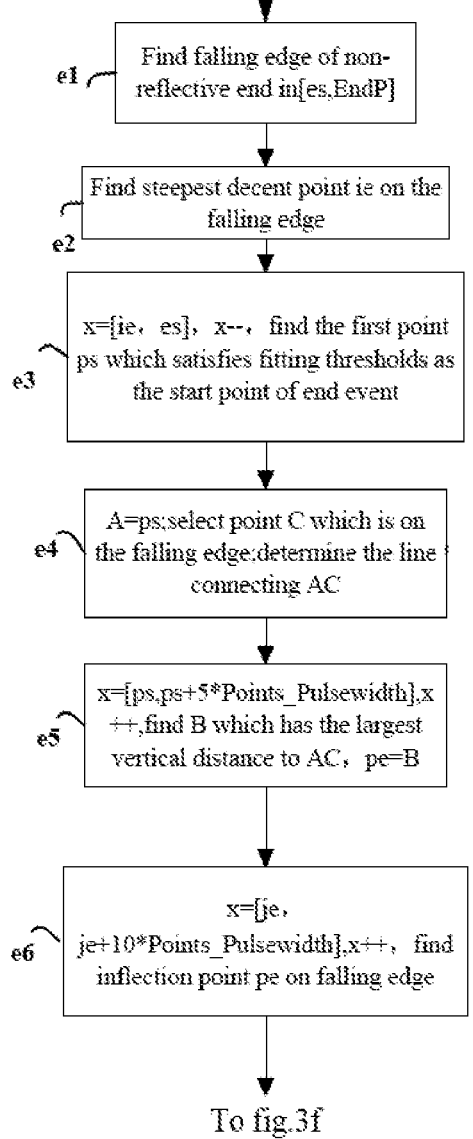

On the other hand, FIG. 3e shows locating steps for a non reflection end event. Specifically, in the case of FIG. 4c, the end event does not meet the condition c2, and hence is not a reflection peak, but also has a falling edge. In [es, EndP], the falling edge is found, and further finding the steepest falling point ie on the falling edge (which can be achieved by a simple comparison method for comparing the difference between adjacent two points). Similarly, in [ie, es], using reverse piecewise linear fitting method to find a point A, as shown in FIG. 2b as A.

Next, e4 will be performed. As shown in FIG. 2b, a certain point B on the falling edge can be selected (which can be the steepest falling point ie), making a connection to get a line segment AB. A point C can be found by searching in [A, B] with the maximum vertical distance to the line segment AB. The point C can be taken as the starting point ps of the end event, as shown in FIG. 4c as 405. In addition, for simplicity, the end (right end point) of the falling edge can be used as the end point pe of the end event.

Figure 3F:
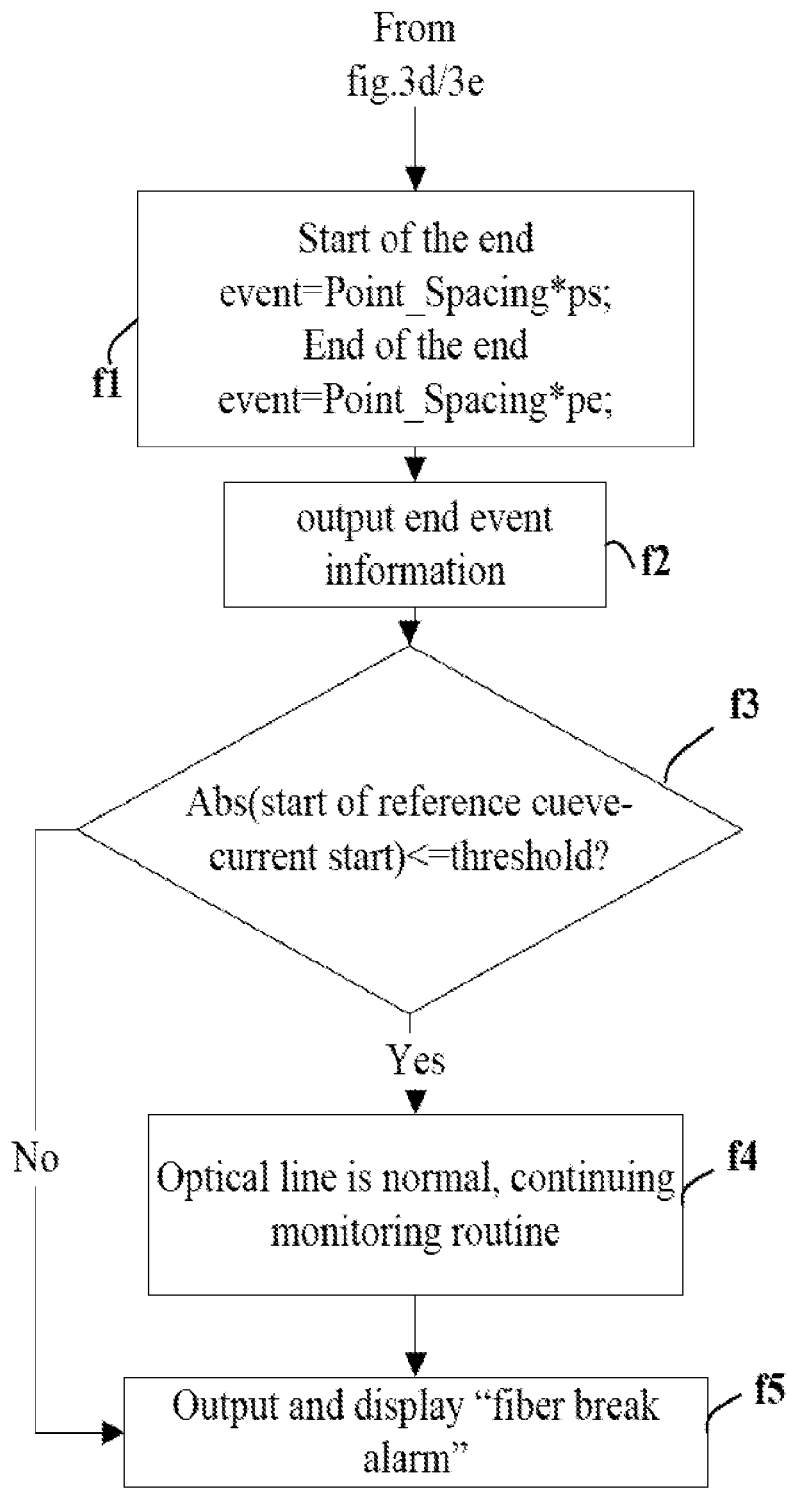

FIG. 3f is detailed description for step f of comparing and analyzing breakpoint of the optical fiber. Specifically, after the end of the end event is detected, position information (abscissa value) of the starting point ps and end point pe of the end event is compared with a reference curve (data curve in normal working state measured by OTDR). If condition f3 is met (i.e., the starting position of the event and the position of the reference curve did not deviate beyond the threshold), the link is normal with no breakpoint. Otherwise, the optical fiber interrupt alarm is issued, and the interrupt position is the starting and end position of the end event.

Figure 4B:
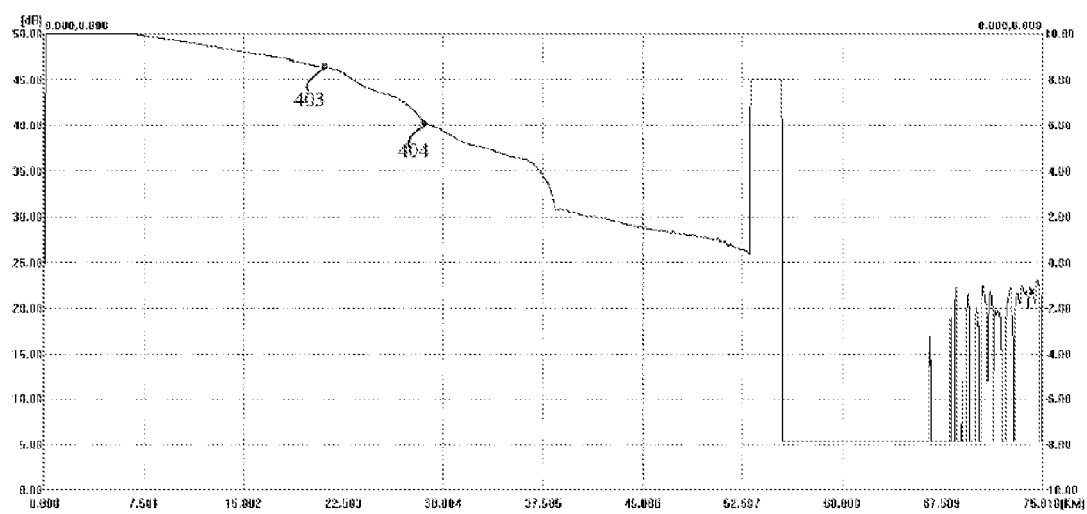
FIGS. 4b, 4d and 4f show results from detecting starting point and end point of the end event of the OTDR curve in the prior art, for cases of same curves as those in the FIGS. 4a, 4c and 4e.
Figure 4C:
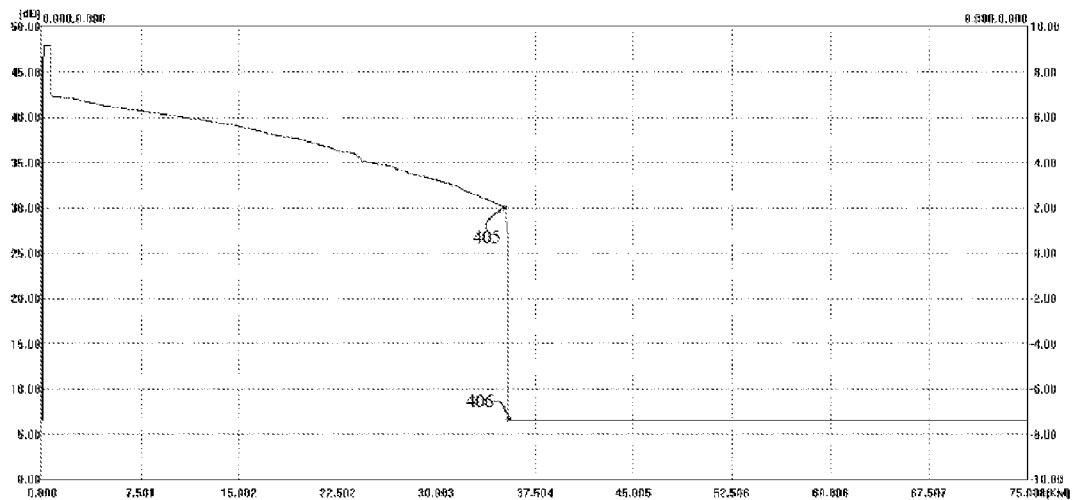
Figure 4D:
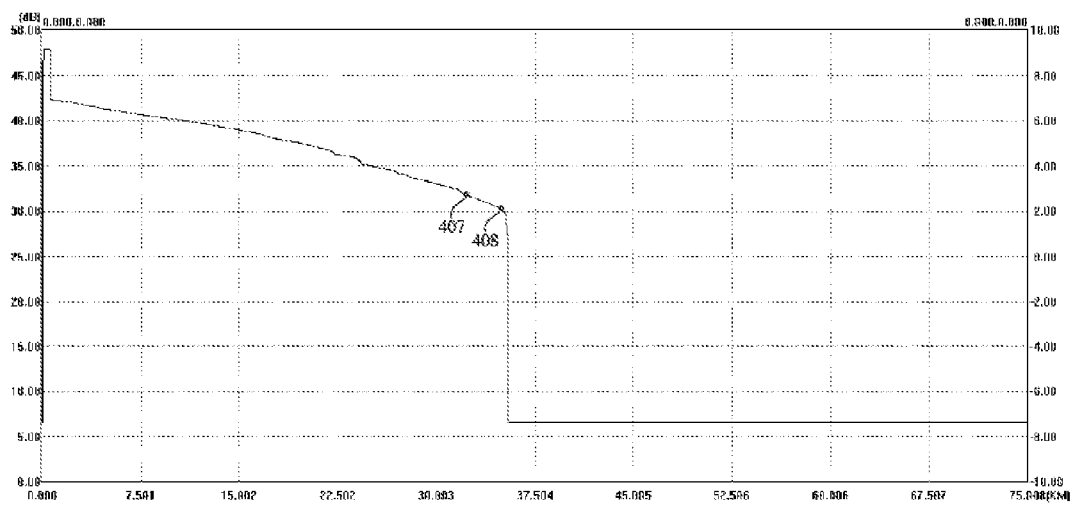
Figure 4E:
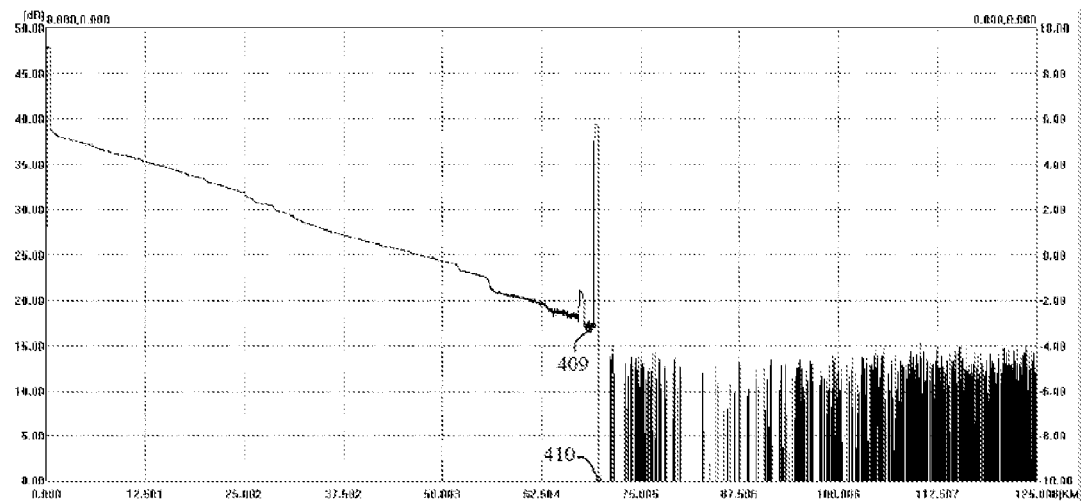
Figure 4F:
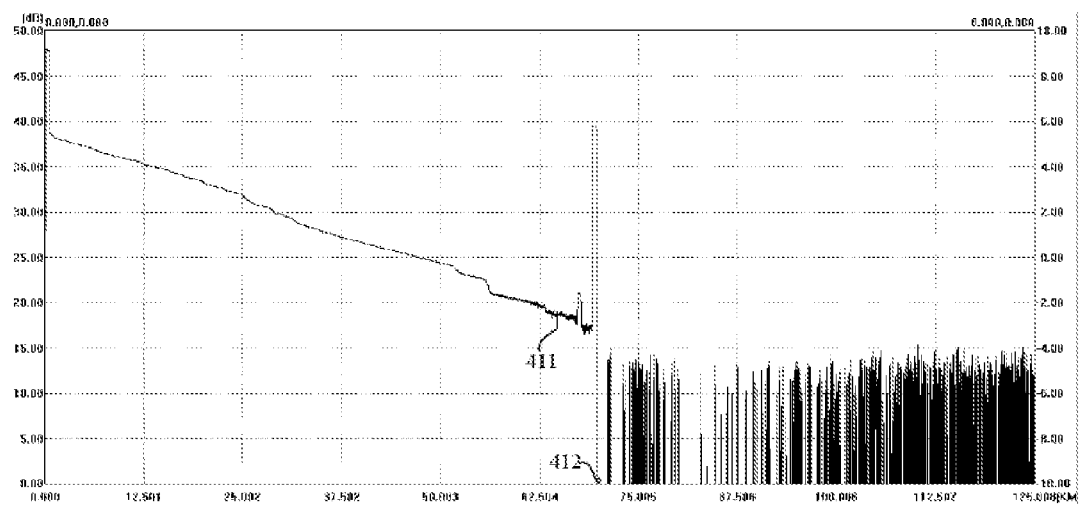

By comparing FIG. 4a and FIG. 4b of the prior art, it can be seen that through the selection of mathematical characteristics peculiar to reflection peak, large attenuation and end reflection peaks can be distinguished, while similar OTDR may detect attenuation zone 403, 404 causing an error. By comparing FIG. 4c and FIG. 4d of the prior art, it can be seen that embodiments of the invention can locate the end event without reflection peaks (non reflection end events), while similar OTDR may detect slope of 407, 408 in front of the end event, causing an error; By comparing FIG. 4e and FIG. 4f of the prior art, it can be seen that embodiments of the invention can resist noise jitter effect in online mode, while similar OTDR may detects the noise region 411, causing an error.

Therefore, embodiments of the invention add a multi-case determination mechanism for end event detection, reduce effect of noise and business signal, improve accuracy of method for detecting OTDR curve end event, ensure various online end event analysis results and data and events were consistent, so that it can accurately locate fiber breakpoint in online mode.

It will be apparent that many modifications and variations may be effected without departing from the scope of the novel concepts of the present invention.

What is claimed is:

1. A method for locating a breakpoint of an optical fiber by detecting OTDR curve end event in online mode, comprising the following steps:
   Step 1, OTDR issuing test light to an optical fiber business link, and receiving reflected light, to form a data curve of reflection sampling points including end event;
   Step 2, finding a head reflection point (is) in the data curve of the reflection sampling points;
   Step 3, on the data curve of reflection sampling points, performing forward traversal from the head reflection point (is), to find a first sampling point, of which sampling value reaches a first predetermined threshold value, as an end point (EndP) of search interval;
   Step 4, in region of [the end point of search interval, the head reflection point] of the data curve of reflection sampling points, performing reverse piecewise linear fitting, and when a line segment after the linear fitting meets a predetermined condition, taking a starting point of the line segment as a starting point (es) of the search interval;
   Step 5, if an absolute value of a difference between maximum sampling value (je) in the search interval and a sampling value of the starting point of the search interval is greater than a second predetermined threshold value, determining an end event as a reflection end event, otherwise determining the end event as a non reflection end event.

2. The method in claim 1, further comprising:
   Step 6, if the end event is a reflection end event, performing the following operation:
   Step 6-1, in a region of [maximum sampling value point in the search interval, the starting point of the search interval] of the data curve of reflection sampling points, performing reverse piecewise linear fitting point-by-point, when a fitted line segment meets the predetermined condition, taking a starting point of the line segment as a first candidate starting point (ps) of the end event;
   Step 6-2, in a region of [maximum sampling value point in the search interval, the starting point of the search interval] of the data curve of reflection sampling points, finding a inflection point of a rising edge forwardly, as a second candidate starting point (ps1) of the end event;
   Step 6-3, taking a point with smaller sampling value of the first and the second candidate starting points, as the starting point of the end event.

3. The method in claim 1, further comprising:
   Step 6, if the end event is a non reflection end event, performing the following operation:
   Step 6-1, in a region of [maximum sampling value point in the search interval, the starting point of the search interval] of the data curve of reflection sampling points, performing reverse piecewise linear fitting point-bypoint, when a fitted line segment meets the predetermined condition, taking a starting point of the line segment as A;

Step 6-2, in a region of [maximum sampling value point in the search interval, the starting point of the search interval] of the data curve of reflection sampling points, finding a inflection point of a falling edge forwardly, taking a steepest falling point B (ie) on the falling edge, connecting points A and B to get a line segment AB, taking a point C with largest vertical distance to the line segment AB in a region of [A, B] of the data curve of reflection sampling points as the starting point (ps) of the end event.

4. The method in claim 1, further comprising:

Step 6, if difference between a position of the starting point of the end event and a position of a starting point of an end event in reference curve is not larger than a third predetermined threshold, then determining no breakpoint in the optical fiber, otherwise determining breakpoint in the optical fiber appeared.

5. The method in claim 2, further comprising:

Step 6-4, in a region after the maximum sampling value point in the search interval, finding a inflection point of a falling edge forwardly, as an end point (pe) of the reflection end event.

6. The method in claim 3, further comprising:

Step 6-3, in a region of [maximum sampling value point in the search interval, the starting point of the search interval] of the data curve of reflection sampling points, finding a inflection point of a falling edge forwardly, as an end point (pe) of the non reflection end event.

7. The method in claim 1, wherein the predetermined condition is that:

1) a slope of the line segment is between −0.1 and −0.5; and
2) both of an absolute value and variance of the line segment are less than 1.

8. The method in claim 1, wherein the Step 2 comprises:

Step 2-1, dividing the sampling points of the data curve of reflection sampling points into multiple groups, comparing sampling values of corresponding points in each group, to find a point (is) with a sampling value larger than a sampling value of corresponding point in adjacent group, as a head reflection point (is).

9. The method in claim 3, further comprising:

Step 7, if difference between a position of the starting point of the end event and a position of a starting point of an end event in reference curve is not larger than a third predetermined threshold, then determining no breakpoint in the optical fiber, otherwise determining breakpoint in the optical fiber appeared.

10. The method in claim 2, wherein the predetermined condition is that:

1) a slope of the line segment is between −0.1 and −0.5; and
2) both of an absolute value and variance of the line segment are less than 1.

11. The method in claim 3, wherein the predetermined condition is that:

1) a slope of the line segment is between −0.1 and −0.5; and
2) both of an absolute value and variance of the line segment are less than 1.

* * * * *